United States Patent [19]

Fisher et al.

[11] 4,006,213
[45] Feb. 1, 1977

[54] HALOGEN TIN ELECTRODEPOSITION BATH SLUDGE TREATMENT

[75] Inventors: Thomas W. Fisher; Stewart E. Rauch, Jr., both of Bethlehem; Richard N. Steinbicker, Coopersburg, all of Pa.

[73] Assignee: Bethlehem Steel Corporation, Bethlehem, Pa.

[22] Filed: July 25, 1975

[21] Appl. No.: 598,979

[52] U.S. Cl. .............................. 423/92; 204/54 R; 423/140; 423/182; 423/367; 423/618; 423/632; 423/633

[51] Int. Cl.² ...................................... C01G 19/02

[58] Field of Search .............. 423/92, 98, 140, 150, 423/367, 618, 182, 632, 633; 204/54 R, 94

[56] References Cited

UNITED STATES PATENTS

| 1,252,742 | 1/1918 | Tillinghast | 423/367 |
|---|---|---|---|
| 1,670,307 | 5/1928 | Little | 423/98 |
| 1,902,735 | 3/1933 | Tamaru et al. | 423/98 |
| 2,366,915 | 1/1945 | Lento, Jr. et al. | 423/367 |
| 2,436,974 | 3/1948 | Richter | 423/98 |
| 3,346,468 | 10/1967 | Jongkind | 204/105 R |
| 3,907,653 | 9/1975 | Horn | 204/54 R |

OTHER PUBLICATIONS

Cotton and Wilkinson, *Advanced Inorganic Chemistry, A Comprehensive Text*, Interscience Publishers, 1962, pp. 355,356,364.

Primary Examiner—Earl C. Thomas
Assistant Examiner—Wayne A. Langel
Attorney, Agent, or Firm—Joseph J. O'Keefe; Charles A. Wilkinson

[57] ABSTRACT

A process for the extraction and recovery of hydrated stannic oxide and alkali metal ferrocyanide from the sludge formed in a halogen tin electrodeposition bath is described. The process comprises dissolving the ferrocyanide compounds and the tetravalent tin compounds present in the sludge in an alkaline medium, removing any insoluble materials, precipitating hydrated stannic oxide from the solution by neutralization of the solution, and separating the hydrated stannic oxide from the solution which then contains ferrocyanide ion together with acid and base counterions.

1 Claim, 1 Drawing Figure

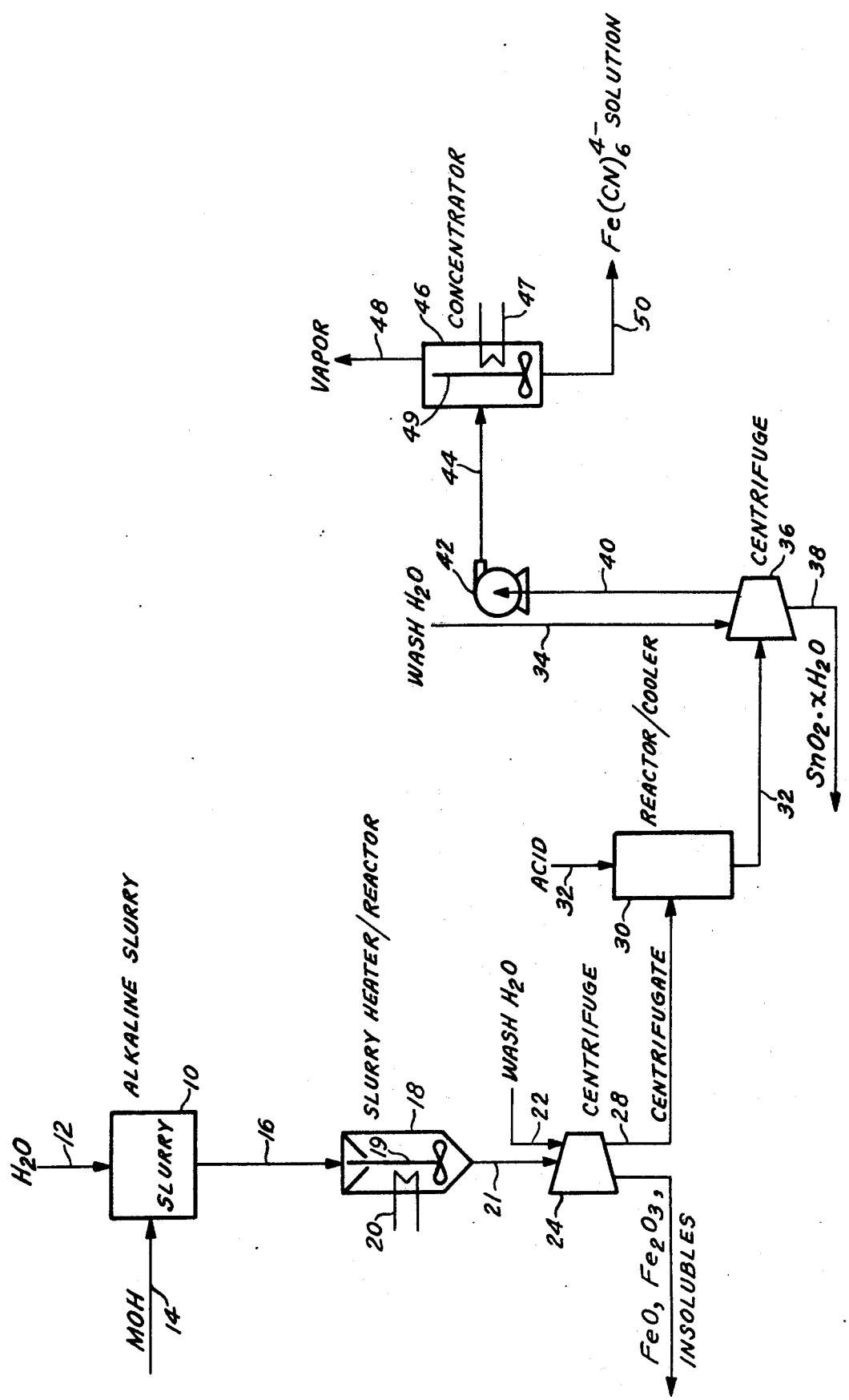

HALOGEN TIN ELECTRODEPOSITION BATH SLUDGE TREATMENT

BACKGROUND OF THE INVENTION

This invention relates to the recovery of useful materials from waste materials and more particularly to the treatment of sludge formed in tin plating baths to recover useful quantities of tin compounds and ferrocyanide compounds for recycling.

Among the commercial processes used to produce tin plated steel strip is the so-called Halogen Tin Electro-deposition process. In this process, pickled and washed steel strip is passed into a bath containing a complex stannous fluoride anion, thought to be $SnF_6^{4-}$ (hexafluorostannate(II)), sodium bifluoride, hydrochloric acid and minor amounts of various addition agents such as grain refiners, all as well known to those skilled in the art. The strip is made cathodic as it passes into the bath and a metallic tin anode is immersed in the bath. In operation, an electric current is applied causing the stannous fluoride complex ion to approach the cathodic steel strip surface where it is reduced to metallic tin, resulting in the deposition of a layer of tin on the steel strip.

One of the disadvantages of this halogen tin process is that the bath tends to accumulate an ever increasing amount of sludge during operation, the major component of which sludge is sodium hexafluorstannate(IV), $Na_2SnF_6$, together with some hydrated stannic oxide, $SnO_2 \cdot xH_2O$. The hexafluorostannate (IV) complex is formed by air oxidation of the hexafluorostannate(II) complex. This oxidation of stannate(II) to stannate(IV) results from the entrapment of air in the plating solution due to vigorous agitation of the plating bath caused by the high line speed of the strip. Although the oxidation is kinetically slow, the rate may be catalytically increased in the presence of dissolved iron, which is present in the plating bath due, at least in part, to incomplete washing of the strip following the acid pickle.

In order to minimize the amount of ferrous ion present in the electroplating bath, and, thereby, prevent catalysis of the hexafluorostannate(II)/hexafluorostannate(IV) oxidation, sodium ferrocyanide, $Na_4[Fe(CN)_6] \cdot 10H_2O$, is periodically added to the bath. The ferrocyanide ion, $Fe(CN)_6^{4-}$, has great affinity for ferrous ion, and will readily combine therewith to form a so called ferro-ferrocyanide complex ion which will precipitate from the bath solution as $Fe_2Fe(CN)_6$. This salt is, in turn, slowly oxidized by the air which is drawn into the bath, to ferriferrocyanide $Fe_4[Fe(CN)_6]_3$, which along with the $Na_2SnF_6$ and $SnO_2 \cdot xH_2O$ then forms a portion of the bath sludge which must be periodically removed. Sodium ferrocyanide additions are then made periodically in order to replenish the ferrocyanide available to remove any ferrous ion present.

The bath sludge is of commercial value due to the presence of the high-grade tin source compound, $Na_2SnF_6$, and a well known process is customarily used for its recovery. This process involves treating the sludge with a sufficient volume of hot water to leach the majority of the $Na_2SnF_6$ from the sludge. The insoluble matter remaining, which is hereafter called secondary sludge, is removed from the hot water solution and, depending on the tin content, discarded or sold to a smelter. The clear solution remaining is then further processed to obtain a tin bearing compound or metallic tin.

Thus the presently used process for halogen tin sludge treatment fails to recover any of the ferrocyanide present in the halogen tin bath sludge. The failure to extract the ferrocyanide portion results in both an increased cost of the tin plating operation itself (due to a constant need for fresh sodium ferrocyanide) and a potential pollution problem due to the cyanide content of the secondary sludge which must be discarded.

SUMMARY

We have discovered a novel process of treating halogen tin sludge which results both in an increased efficiency in chemical tin recovery and in a recovery of ferrocyanide. Furthermore, our process may be used either on the initial sludge as removed from the bath, or on the secondary sludge, following the conventional hot water extraction. Finally, our process is operative over a wide temperature range.

In our process, halogen tin bath sludge is hydrolyzed in alkaline media to form hexahydroxostannate(IV) ion, $Sn(OH)_6^{2-}$, and ferrocyanide ion, $Fe(CN)_6^{4-}$. After filtering the alkaline solution to remove iron oxides and other residual insolubles, the solution pH is lowered by addition of a mineral acid solution to a point at which the $Sn(OH)_6^{2-}$ is neutralized to form hydrated stannic oxide, $SnO_2 \cdot xH_2O$. This tin precipitate is then removed to leave a solution containing ferrocyanide ion together with the acid and alkali counter ions. This final solution may be either concentrated and returned to the halogen tin bath as a source of ferrocyanide, or solid alkali metal ferrocyanide precipitated and purified by any one of several means well known to those skilled in the art.

BRIEF DESCRIPTION OF THE DRAWINGS

The FIGURE shows a schematic representation of the steps in the process of recovering hydrated stannic oxide and ferrocyanide from halogen tin electrodeposition bath sludge.

DETAILED DESCRIPTION OF THE INVENTION

A typical halogen tin electrodeposition bath will initially contain hydronium, $H_3O^+$, fluoride, $F^-$, sodium, $Na^+$, hexafluorostannate(II) complex, $SnF_6^{4-}$, ions, and addition agents. During the plating operation, dissolved iron will be introduced into the bath due, at least in part, to the incomplete washing of the steel strip subsequent to acid pickling. In addition, molecular oxygen, $O_2$, will be introduced into the solution as a result of the surface turbulence due to the high speed of the steel strip as it passes through the bath. The dissolved oxygen will oxidize the hexafluorostannate(II) to hexafluorstannate(IV) according to equation I:

$$4H_3O^+ + 4Na^+ + 2SnF_6^{4-} + O_2 \rightarrow 2Na_2[SnF_6] + 6H_2O; \quad (I)$$

some of which will subsequently hydrolyze according to equation Ia:

$$Na_2SnF_6 + 2H_2O \rightarrow SnO_2 + 4H^+ + 2Na^+ + 6F^-. \quad (Ia)$$

As discussed previously, dissolved iron, present in the bath, catalyzes Equation (I), increasing the reaction rate and thus aggravating the loss of the active plating ingredient, according to the following reactions:

$$4H_3O^+ + 4Fe(H_2O)_6^{2+} + O_2 \rightarrow 4Fe(H_2O)_6^{3+} + 6H_2O \quad (Ib)$$

$$2Fe(H_2O)_6^{3+} + SnF_6^{4-} \rightarrow SnF_6^{2-} + 2Fe(H_2O)_6^{2+} \quad (Ic)$$

For this reason, sodium ferrocyanide is added to the bath and a concentration thereof approximately 1 gram per liter is maintained by periodic addition. The ferrocyanide eliminates any iron(II) catalysis of Equation (I) by precipitating the iron(II) according to the equation:

$$2Fe_{aq}^{2+} + Fe(CN)_6^{4-} \rightarrow Fe_2[Fe(CN)_6] \tag{II}$$

The precipitate from Equation (II) is slowly oxidized in the presence of dissolved oxygen and excess sodium ferrocyanide according to the equation:

$$4H_3O^+ + 2Fe_2[Fe(CN)_6] + [Fe(CN)_6]^{4-} + O_2 \rightarrow Fe_4[Fe(CN)_6]_3 + 6H_2O \tag{III}$$

The solid precipitates from equations I, Ia, II and III, then, form a substantial portion of the sludge which accumulates in the bath over a period of time. At intervals, therefore, the plating operation is shut down, the accumulated sludge removed, and the sludge treated to recover the tin in the $Na_2[SnF_6]$ and $SnO_2$ and the ferrocyanide in the $Fe_2[Fe(CN)_6]$ and $Fe_4[Fe(CN)_6]_3$. This is accomplished, in accordance with the present invention, by preparing a slurry of the sludge with a pH of from about 10 to about 14. Preparation of this alkaline slurry may be accomplished either by adding a sufficient amount of an alkali metal hydroxide to an aqueous slurry of the sludge or by slurrying the pure sludge in an already basic solution. Both alternative methods are equally effective for our purpose and both are contemplated within this process.

Preparation of this alkaline slurry results in the basic hydrolysis of the components as follows:

$$Na_2[SnF_6] + 6OH^- \rightarrow 2Na^+ + 6F^- + Sn(OH)_6^{2-} \tag{IV}$$

$$SnO_2 + 2H_2O + 2OH^- \rightarrow Sn(OH)_6^- \tag{IVa}$$

$$Fe_2[Fe(CN)_6] + 4OH^- \rightarrow 2FeO + Fe(CN)_6^{-4} + 2H_2O \tag{V}$$

$$Fe_4[Fe(CN)_6]_3 + 12OH^- \rightarrow 2Fe_2O_3 + 3Fe(CN)_6^{4-} + 6H_2O \tag{VI}$$

As these reactions are heterogeneous, i.e. reaction of a solid with a solution, heating and/or stirring, which increase the solid/liquid interaction, will increase the rate of reactions (IV)–(VI). Our data indicates that, although the ferrocyanide dissolution (V and VI) is rapid even at room temperature, the stannic oxide dissolution (IVa) time is reduced from approximately 30 hours at 20°–25° C to approximately 2 hours at 60°–65° C. Indeed our process is effective at temperatures up to 80° C, above which temperature oxidation of ferrocyanide to ferricyanide becomes operative in alkaline media. We prefer, however, to use vigorous stirring and temperatures of approximately 60°–65° C which decrease the reaction time, yet avoid significant oxidation.

Upon completion of base hydrolysis, which is evidenced by the pH remaining stable after alkali addition has been stopped, the solution is centrifuged or filtered hot to remove the iron-rich, insoluble material. This material may either be discarded or further processed as a high grade iron ore by well known methods. The clear centrifugate of filtrate, at a temperature of not more than 60°–65° C, is then neutralized to a solution pH of from about 6.5 to about 7.5 with a solution of either HF or HCl which results in the precipitation of hydrated stannic oxide according to the reaction $$Sn(OH)_6^{2-} + 2H_3O^+ \rightarrow SnO_2 \cdot xH_2O. \tag{VII}$$

The slurry is then centrifuged or filtered to give a solid mass of $SnO_2 \cdot xH_2O$ and a solution containing ferrocyanide ion. This final ferrocyanide solution is then either concentrated and added directly to the halogen tin bath as a ferrocyanide source or further treated by well known means to isolate solid alkali metal ferrocyanide.

Referring to the drawing, the halogen tin bath sludge, either initial or secondary, containing $Na_2SnF_6$, $SnO_2$, $Fe_2[Fe(CN)_6]$ and $Fe_4[Fe(CN)_6]_3$, is placed in a slurry chamber 10. Water and alkali metal hydroxide solution are introduced into slurry chamber 10 via lines 12 and 14 respectively. The resulting slurry is fed, via line 16, into reactor 18 which is equipped with stirring and heating means, shown respectively as a stirrer 19 and a heating coil 20.

After reaction is complete, the slurry is transferred via line 21 to centrifuge 24, where it is centrifuged to separate the ferrous and ferric oxides, and other insoluble material, from the solution containing the tin and ferrocyanide ions. The centrifugate or separated liquid is transferred through line 28 to a reactor 30. The separated solid is then washed while still in centrifuge 24 with water from line 22, centrifuged again, and the centrifugate transferred to reactor 30 via line 28. The solid material is then removed from the reactor 24 and either discarded or used as a high grade iron ore.

The combined solution in reactor 30 is allowed to cool and an HF or HCl solution is introduced via line 32. Addition of acid is continued until the solution pH is between about 6.5 to about 7.5.

The resultant solution containing the $SnO_2 \cdot xH_2O$ is transferred, via line 32, to centrifuge 36 where it is centrifuged. The clear centrifugate is drawn, through line 40, by pump 42, and directed through line 44 to evaporator 46. The hydrated stannic oxide remaining in centrifuge 36 is washed with water from line 34 and the washings are also pumped to the evaporator 46. The washed hydrated stannic oxide is then removed at 38 for use as a high grade tin ore.

The combined centrifugate/wash solution in evaporator 46 is then concentrated by evaporation induced by heating coil 47, with simultaneous stirring by stirrer 49 to a ferrocyanide concentration of the equivalent of not less than 10 grams per liter of $Na_4[Fe(CN)_6] \cdot 10H_2O$. The concentrated ferrocyanide solution removed from evaporator 46 via line 50 may, alternatively, either be used as a source of ferrocyanide for direct halogen tin bath addition, or may be treated by any well known means, such as further evaporation, fractional crystallization or ion exchange separation, to isolate pure alkali metal ferrocyanide. Water vapor removed by evaporation is removed via line 48 to suitable condensation means not shown.

We, of course, do not wish to be limited by the specific apparatus noted herein. For example, standard filtration apparatus may be substituted for centrifuges 24 and 36 without, in any way, departing from the essence of our invention. In addition, the concentrations of acid and base, used herein are by no means critical. What is critical to the reactions here presented is the solution pH. Thus our process is operative with virtually any acid or base solution concentration, with, however, higher concentrations being preferred in order to reduce total solution volume.

In the preferred embodiment, a 20% by weight aqueous slurry of secondary sludge is prepared. The slurry is warmed, to approximately 60°–65° C with stirring. 60°–65° C, 10M sodium hydroxide solution is added to the slurry with stirring until the pH of the solution remains stable at pH 12 after the addition is stopped. The resulting solution is centrifuged hot and the insoluble matter, containing iron oxides, is washed, dried and removed for further processing. To the warm combined centrifugate is added a 5M aqueous hydrochloric acid solution until a final pH of 6.5–7.5 is reached and maintained for at least 60 minutes after addition ceased. The solution is then centrifuged hot to remove the $SnO_2 \cdot xH_2O$ formed during the neutralization which is then washed and centrifuged once more. The combined centrifugate is concentrated to a sodium ferrocyanide concentration of not less than 10 grams per liter preferably 25–50 g/l and then utilized as a source of ferrocyanide for direct bath addition.

Utilization of the general procedures described allow substantially quantitative recovery of the valuable components in sludge formed in a halogen tin bath. Such recovery not only reduces the demand for fresh starting materials in the plating operation, but also reduces the environmental hazard in the disposal of cyanide containing, secondary sludge.

We claim:

1. A process for recovering stannic oxide, iron oxides and sodium ferrocyanide from sludge containing sodium hexafluorstannate, hydrated stannic oxide and ferri-ferrocyanide, which sludge has been derived from a halogen tin electroplating bath, comprising:

a. removing sludge from a halogen tin electro-plating bath,
   b. diluting the electroplating sludge with water to form a slurry having a sludge weight percent of from about 10 to 20,
   c. treating the slurry with an aqueous solution of a 1 to 10 molar alkali metal hydroxide while heating the slurry to a temperature up to 80° C with agitation until a constant pH within a range of 10 to 14 is attained, thereby forming a precipitate containing iron oxides and other insolubles,
   d. separating said iron oxides suitable for use as high grade iron ore and said other residual insolubles from the slurry to provide a first clarified solution containing stannate and ferrocyamide ions,
   e. treating the first clarified solution at a temperature of not more than 65° C with a 1 to 5 molar aqueous solution of an acid selected from the group consisting of hydrochloric and hydrofluoric acid until a final solution pH of about 6.5 to 7.5 is attained to precipitate said stannate ions as hydrated stannic oxide suitable for use as high grade tin ore,
   f. removing the hydrated stannic oxide to leave a second clarified solution containing alkali metal ferrocyanide, and
   g. concentrating the second clarified solution to an alkali metal ferrocyanide concentration of not less than 10 grams per liter suitable for reuse as an addition of alkali metal ferrocyanide to an electroplating bath.

* * * * *